United States Patent
Noh et al.

(10) Patent No.: US 8,509,053 B2
(45) Date of Patent: Aug. 13, 2013

(54) METHOD OF MULTIPLEXING MULTIPLE ACCESS REGION

(75) Inventors: Min Seok Noh, Seoul (KR); Ki Ho Nam, Gwangmyeong-si (KR); Seung Hee Han, Anyang-si (KR); Han Gyu Cho, Seoul (KR); Hyun Woo Lee, Anyang-si (KR); Dong Cheol Kim, Suwon-si (KR); Sung Ho Moon, Anyang-si (KR); Jin Sam Kwak, Gunpo-si (KR); Sung Gu Cho, Gunpo-si (KR); Yeong Hyeon Kwon, Suwon-si (KR)

(73) Assignee: LG Electronics Inc., Seoul (KR)

( * ) Notice: Subject to any disclaimer, the term of this patent is extended or adjusted under 35 U.S.C. 154(b) by 345 days.

(21) Appl. No.: 12/810,302

(22) PCT Filed: Dec. 18, 2008

(86) PCT No.: PCT/KR2008/007523
§ 371 (c)(1),
(2), (4) Date: Jun. 23, 2010

(87) PCT Pub. No.: WO2009/082127
PCT Pub. Date: Jul. 2, 2009

(65) Prior Publication Data
US 2010/0272055 A1    Oct. 28, 2010

Related U.S. Application Data

(60) Provisional application No. 61/016,499, filed on Dec. 24, 2007.

(30) Foreign Application Priority Data

Mar. 19, 2008  (KR) ........................ 10-2008-0025479

(51) Int. Cl.
*H04J 11/00*    (2006.01)
(52) U.S. Cl.
USPC ........................................... 370/208; 370/344
(58) Field of Classification Search
USPC ................................................. 370/208, 344
See application file for complete search history.

(56) References Cited

U.S. PATENT DOCUMENTS

| | | | |
|---|---|---|---|
| 7,420,946 B2* | 9/2008 | Kim et al. | 370/335 |
| 2006/0291470 A1* | 12/2006 | Khandekar et al. | 370/395.1 |
| 2007/0183386 A1 | 8/2007 | Muharemovic et al. | |
| 2007/0291634 A1 | 12/2007 | Kwon et al. | |

(Continued)

*Primary Examiner* — Jay P Patel
(74) *Attorney, Agent, or Firm* — Lee, Hong, Degerman, Kang & Waimey

(57) ABSTRACT

A method for multiplexing one or more multiple access regions is disclosed. The method for multiplexing one or more multiple access regions in a wireless access system comprises multiplexing the one or more multiple access regions so that a first base station and a second base station among a plurality of base stations which use one or more multiple access schemes together under a multi-cell environment use a single multiple access scheme in a predetermined resource region allocated to each of the first base station and the second base station; and transmitting multiplexing information obtained from the multiplexing the one or more multiple access regions to a mobile station included in a cell region of the plurality of base stations. As a user uses SC-FDMA scheme and OFDMA scheme together, it is possible to obtain a single carrier effect of the SC-FDMA system and flexibility of the OFDMA system on a time axis and a frequency axis.

5 Claims, 9 Drawing Sheets

(56) References Cited

U.S. PATENT DOCUMENTS

| | | |
|---|---|---|
| 2007/0291635 A1 | 12/2007 | Yang et al. |
| 2008/0096581 A1* | 4/2008 | Do et al. .................. 455/456.2 |
| 2008/0101306 A1* | 5/2008 | Bertrand et al. .............. 370/336 |
| 2008/0268785 A1* | 10/2008 | McCoy et al. ............. 455/67.11 |
| 2009/0046645 A1* | 2/2009 | Bertrand et al. .............. 370/329 |
| 2009/0110114 A1* | 4/2009 | Onggosanusi et al. ....... 375/299 |

\* cited by examiner (a)

(b)

SC-FDMA Structure (a)

OFDMA Structure (b)

METHOD OF MULTIPLEXING MULTIPLE ACCESS REGION

CROSS-REFERENCE TO RELATED APPLICATIONS

This application is the National Stage filing under 35 U.S.C. §371 of International Application No. PCT/KR2008/007523, filed on Dec. 18, 2008, which claims the benefit of earlier filing date and right of priority to Korean Application No. 10-2008-0025479, filed on Mar. 19, 2008, and also claims the benefit of U.S. Provisional Application Ser. No. 61/016,499, filed on Dec. 24, 2007.

TECHNICAL FIELD

The present invention relates to a wireless access system, and more particularly, to a method for multiplexing one or more multiple access regions.

BACKGROUND ART

In a downlink (DL) of a 3rd generation partnership project long term evolution (3GPP LTE) system and a downlink (DL) and an uplink (UL) of IEEE 802.16 system, an orthogonal frequency division multiple access (OFDMA) scheme is currently used as a multiple access scheme. Also, the 3GPP LTE system has decided to use a single carrier-frequency division multiple access (SC-FDMA) scheme as a multiple access scheme of an uplink (UL). Herein, a system which uses SC-FDMA scheme will be referred to as SC-FDMA system, and a system which uses OFDMA scheme will be referred to as OFDMA system.

Hereinafter, among the multiple access scheme which are generally used, an OFDMA scheme and an SC-FDMA scheme will be described in brief.

The OFDMA scheme means that differently divided sub-carrier sets (i.e., subchannels) are allocated to several users. The OFDMA scheme has the following features.

(1) A base station can allocate radio resources to a mobile station by two-dimensionally dividing the radio resources on time and frequency regions using the OFDMA scheme. Accordingly, the respective users (or mobile stations) within the same cell which supports the OFDMA scheme can use different subcarrier sets. In this way, the base station can flexibly allocate the radio resources to the mobile station.

(2) The base station can reduce inter symbol interference (ISI) and inter channel interference (ICI) by allocating different subcarriers to the respective users. For example, if the base station can maintain an influence of frequency and timing offset between the respective users at a sufficiently low level, the base station and the mobile station can little be affected by inter cell interference.

(3) In the OFDMA system, the subcarriers are allocated onto a frequency region in accordance with a transmission speed required by each user, whereby channel capacity can be optimized. Namely, the base station can vary the number of subcarriers, which are allocated in accordance with a transmission speed required by each user, by dynamically allocating the subchannels in accordance with a request of each user.

(4) In the OFDMA scheme, since orthogonality between respective symbols within the same cell is sufficiently ensured, there is no limitation in power control of the base station.

However, in the OFDMA system, OFDM symbols on a time region include a plurality of subcarriers which are independently modulated, and if the respective symbols are synchronously added to each other, the total maximum power is more increased than the average power as much as a multiple of the number of subcarriers. Also, in the general OFDMA system, since input data are processed on a frequency region, it is disadvantageous in that a peak to average power ratio (PAPR) increases if the frequency region is transformed to the time region by IFFT block.

The PAPR is one of main factors to be considered during reverse transmission. If the PAPR increases, cell coverage is reduced. Also, the PAPR is directly associated with power amplifier cost of the mobile station in the uplink. Accordingly, if the PAPR increases, since signal power required by the mobile station increases, it is necessary to first reduce the PAPR during reverse transmission.

The OFDMA scheme has a disadvantage in that the PAPR is generally high. Accordingly, in the uplink of the 3GPP LTE system, the SC-FDMA scheme is used as the multiple access scheme. The SC-FDMA scheme (or DFT-spreading OFDMA) is a transmission scheme that reduces signal variation. A transmitter can add a discrete fourier transform (DFT) module to apply the SC-FDMA scheme so as to relatively reduce overlap of synchronous signals in comparison with the OFDMA scheme, thereby preventing the PAPR from increasing.

Finally, as the DFT module is added to the SC-FDMA system, it is possible to obtain a single carrier feature while maintaining orthogonality. Accordingly, when the same power amplifier is used, the SC-FDMA scheme can use more power for signal transmission. As a result, the SC-FDMA scheme has broad cell coverage.

FIG. 1 is a diagram illustrating a procedure of transmitting and receiving a general signal of SC-FDMA system.

Referring to FIG. 1, a data transmission procedure of the SC-FDMA system will be described as follows. A data coding module 101 of a transmitter codes data to be transmitted. The transmitter inputs the coded data to a DFT module 102 and allocates the data to a frequency region through a sub-carrier mapping module 103. The transmitter again transforms the allocated data to the frequency region to a time region signal through an inverse fast fourier transform (IFFT) module 104, inserts cyclic prefix to the data through a CP module and then transmits the data to a receiver (105).

The data transmitted from the transmitter are transmitted to the receiver through a wireless interface. The receiver deletes the CP from the CP module 106 and transforms a symbol received through an FFT module 107 to a frequency region signal. Afterwards, the receiver can perform inverse fourier transform through an inverse discrete fourier transform module 109 after performing de-mapping through a subcarrier de-mapping (or mapping release) module 108. Also, the receiver can interpret the received data through an inverse coding module 110.

The main feature of the SC-FDMA scheme is that the SC-FDMA scheme has a single carrier effect. Referring to FIG. 1, the transmitter (Tx) spreads a transmission signal through DFT and performs localized mapping for a frequency band in a part where the transmission signal is generated or performs equal spaced mapping with a constant frequency interval so as to obtain a single carrier effect. Accordingly, the transmission signal generated using the SC-FDMA system has a small PAPR.

FIG. 2 is a diagram illustrating a method for mapping subcarrier to obtain a single carrier effect in SC-FDMA scheme.

In the SC-FDMA system, a method for allocating resources can be classified in accordance with a method for transferring the output of the DFT module to the IFFT module. Namely, FIG. 2(a) illustrates a method for localized-mapping radio resources in SC-FDMA system, and FIG. 2(b) illustrates a method for distributed-mapping radio resources in SC-FDMA system.

Referring to FIG. 2(a), the localized mapping is that the output of the DFT module is localized in a specific part of each user when being input to the IFFT module. Accordingly, a subcarrier interval of the output of the DFT module becomes identical with a subcarrier interval of the IFFT module.

Referring to FIG. 2(b), the distributed mapping is that the interval between the respective subcarriers is equally allocated for all frequency bands when the output of the DFT module is input to the IFFT module. If channel change is great on a frequency axis (for example, when delay spread of channel is great), the base station allocates resources on the frequency axis to mobile station in a distributed-mapping mode to obtain frequency diversity in the frequency region. Accordingly, in the SC-FDMA system, the output of the DFT is equally distributed in the frequency region to lower the PAPR.

Referring to FIG. 2, in the SC-FDMA scheme, localized mapping should be performed for subcarriers to obtain a single carrier effect, or distributed mapping should be performed for subcarriers to have a constant interval on the frequency axis. Accordingly, although the SC-FDMA system has a low PAPR during subcarrier mapping, it has a disadvantage in that flexibility is reduced in allocating subcarriers.

The aforementioned multiple access schemes have advantages and disadvantages together. Accordingly, a multiple access scheme that can eliminate the disadvantages and use the advantages is required.

DISCLOSURE OF INVENTION

Technical Problem

Accordingly, an object of the present invention is to provide a method of multiplexing multiple access regions, which substantially obviates one or more problems due to limitations and disadvantages of the related art.

Another object of the present invention is to provide a method for multiplexing multiple access regions, in which the same multiple access scheme is used in the same resource regions when one or more multiple access schemes are used together.

Other object of the present invention is to provide a method for multiplexing multiple access regions, in which a frequency division duplication system which uses one or more multiple access schemes maintains a frequency division multiple mode, or a time division duplication system maintains a time division multiple mode.

Technical Solution

In order to solve the above technical problems, the present invention discloses a method for multiplexing one or more multiple access regions.

In one aspect of the present invention, a method for multiplexing one or more multiple access regions in a wireless access system comprises multiplexing the one or more multiple access regions so that a first base station and a second base station among a plurality of base stations which use one or more multiple access schemes together under a multi-cell environment use the same multiple access scheme in a predetermined resource region allocated to each of the first base station and the second base station; and transmitting multiplexing information obtained from the multiplexing the one or more multiple access regions to a mobile station included in a cell region of the plurality of base stations.

The predetermined resource region is a frequency band or a time region. Also, the one or more multiple access schemes include a single carrier frequency division multiple access (SC-FDMA) scheme and an orthogonal frequency division multiple access (OFDMA) scheme.

The step of multiplexing the one or more multiple access regions is multiplexing the one or more multiple access regions in distributed mode in accordance with the single carrier frequency division multiple access (SC-FDMA) scheme and the orthogonal frequency division multiple access (OFDMA) scheme.

The step of multiplexing the one or more multiple access regions is multiplexing the one or more multiple access regions in localized mode in accordance with the single carrier frequency division multiple access (SC-FDMA) scheme and the orthogonal frequency division multiple access (OFDMA) scheme.

The multiplexing information includes information as to whether any one of the SC-FDMA system and the OFDMA system is used in the predetermined same resource region.

The method further comprises sharing the multiplexing information among the plurality of base stations through a backbone network.

Advantageous Effects

According to the present invention, the following effects can be obtained.

As a user uses the SC-FDMA scheme and the OFDMA scheme together, it is possible to obtain a single carrier effect of the SC-FDMA scheme and flexibility of the OFDMA scheme on a time axis and a frequency axis.

Also, the user can maintain a single carrier effect in SC-FDMA region of a hybrid multiple access scheme by using a time division multiple mode and a frequency division multiple mode of a multiple access region according to the hybrid multiple access system.

MODE FOR THE INVENTION

Figure 1:
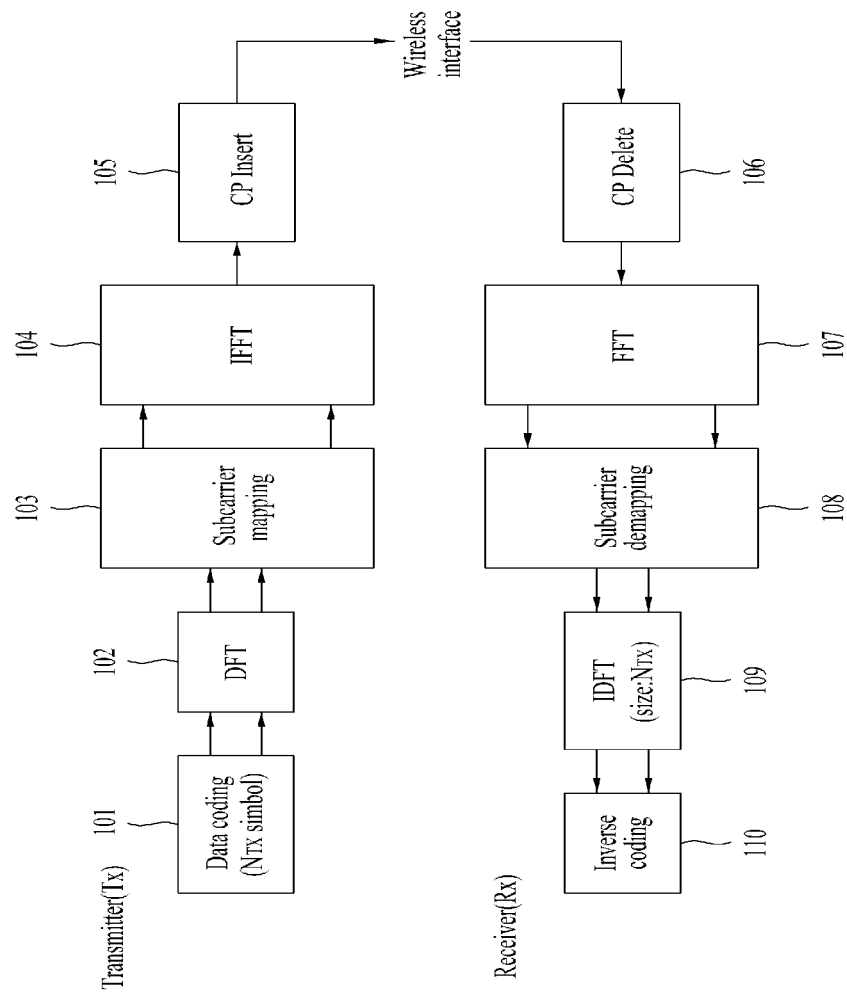
FIG. 1 is a diagram illustrating a procedure of transmitting and receiving a general signal of SC-FDMA system.
Figure 2:
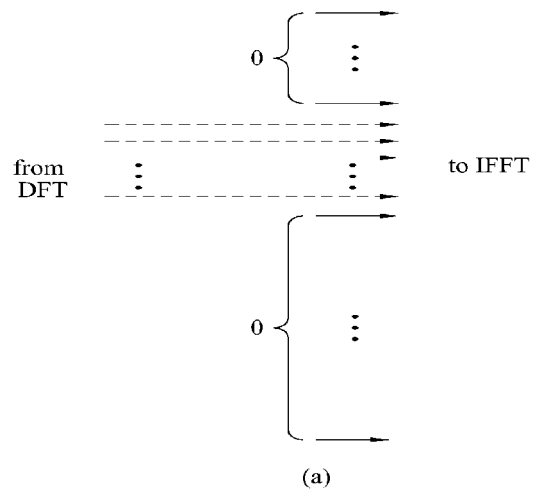
FIG. 2 is a diagram illustrating a method for mapping subcarriers to obtain a single carrier effect in SC-FDMA system.
Figure 2:
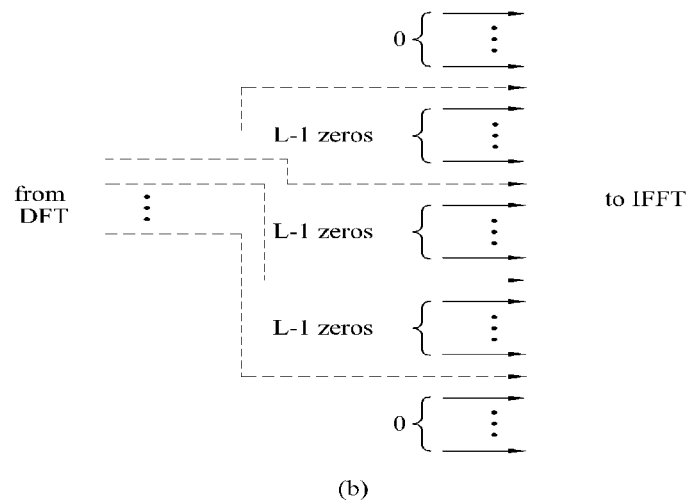

To solve the aforementioned technical problems, the present invention is directed to a wireless access system, and more particularly, to a method for multiplexing one or more multiple access regions.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

The embodiments of the present invention have been described based on the data transmission and reception between a base station and a mobile station. In this case, the base station means a terminal node of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. The base station may be replaced with terms such as a fixed station, Node B, eNode B (eNB), and access point. Also, the mobile station may be replaced with terms such as a user equipment and a mobile subscriber station.

The embodiments according to the present invention may be implemented by various means, for example, hardware, firmware, software, or their combination.

If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method of transmitting and receiving data in the wireless communication system according to the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

The embodiments of the present invention can be supported by standard documents disclosed in at least one of wireless access systems, i.e., IEEE 802 system, 3GPP system, 3GPP LTE system, and 3GPP2 system. Namely, among the embodiments of the present invention, steps or parts which are not described to clarify technical spirits of the present invention can be supported by the above standard documents. Also, all terminologies disclosed herein can be described by the above standard documents. Particularly, the embodiments of the present invention can be supported by one or more of standard documents of IEEE 802.16 system, i.e., P802.16-2004, P802.16e-2005 and P802.16Rev2.

Specific terminologies hereinafter described are provided to assist understanding of the present invention, and various modifications can be made in the specific terminologies within the range that they do not depart from technical spirits of the present invention.

Hereinafter, the preferred embodiments of the present invention will be described in detail with reference to the accompanying drawings.

Figure 3:
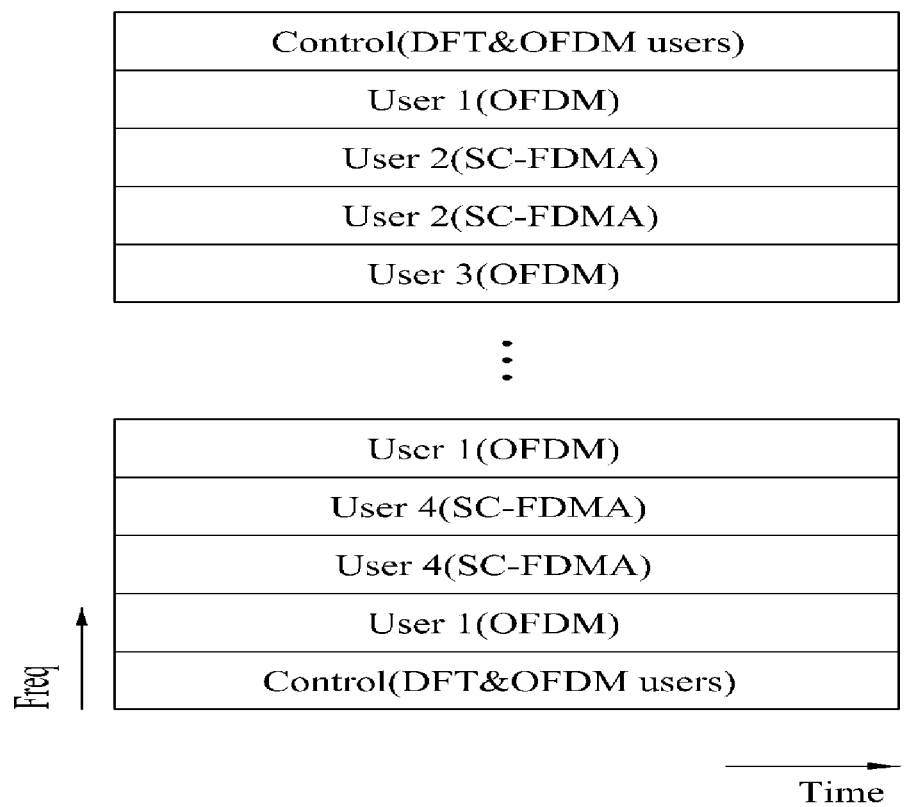
FIG. 3 is a diagram illustrating a exemplary example of a hybrid multiple access system.

FIG. 3 is a diagram illustrating a exemplary example of a hybrid multiple access system.

Referring to FIG. 3, the hybrid multiple access scheme means that SC-FDMA scheme and OFDMA scheme are used together. For example, a base station can divide one radio resource region into one or more frequency regions based on a frequency band. In other words, the base station can divide a frequency band into SC-FDMA (or DFT-spreading OFDMA) region and OFDMA region.

Respective mobile stations can use an advantage of the SC-FDMA scheme having low power back-off by using SC-FDMA scheme or OFDMA scheme suitable for themselves based on the divided frequency band. Also, the hybrid multiple access scheme of FIG. 3 can more efficiently improve throughput of cell edge users than the multiple access scheme which considers only OFDMA, wherein the cell edge users are located at the edge of a cell.

Figure 4:
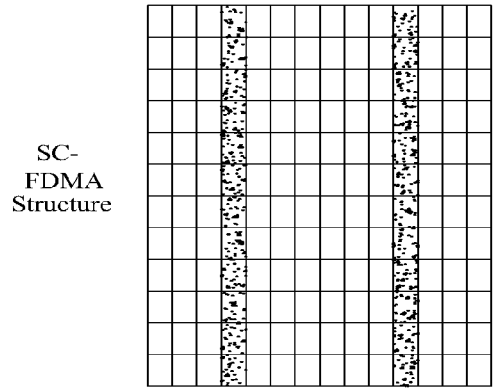
FIG. 4 is a diagram illustrating a method for allocating pilot signals in SC-FDMA scheme and OFDMA scheme.
Figure 4:
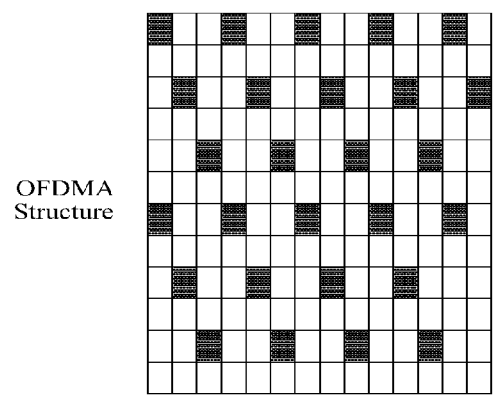

FIG. 4 is a diagram illustrating a method for allocating pilot signals in SC-FDMA scheme and OFDMA scheme.

FIG. 4(a) illustrates a method for allocating pilot signals or reference signals in the SC-FDMA scheme. In FIG. 4(a), a horizontal axis illustrates symbols as a time unit, and a vertical axis illustrates subcarriers as a frequency unit. The SC-FDMA system can allocate pilot signals or reference signals as illustrated in FIG. 4(a) on a time axis to obtain a single carrier effect (for example, flat feature on a frequency axis) and maintain a low PAPR on the time axis.

FIG. 4(b) illustrates a method for allocating pilot signals or reference signals in the OFDMA system. In FIG. 4(b), a horizontal axis illustrates symbols as a time unit, and a vertical axis illustrates subcarriers as a frequency unit. The base station can allocate pilot signals (or reference signals) in a distributed mode on the time axis and the frequency axis to obtain efficiency of limited resource use in the OFDMA region.

However, referring to FIG. 4, allocation locations of the pilot signals (or reference signals) in each of the OFDMA system and the SC-FDMA system are different from each other on the time axis and the frequency axis. In this case, if the hybrid multiple access scheme illustrated in FIG. 3 is used under the multi-cell environment, several problems may occur.

Figure 5:
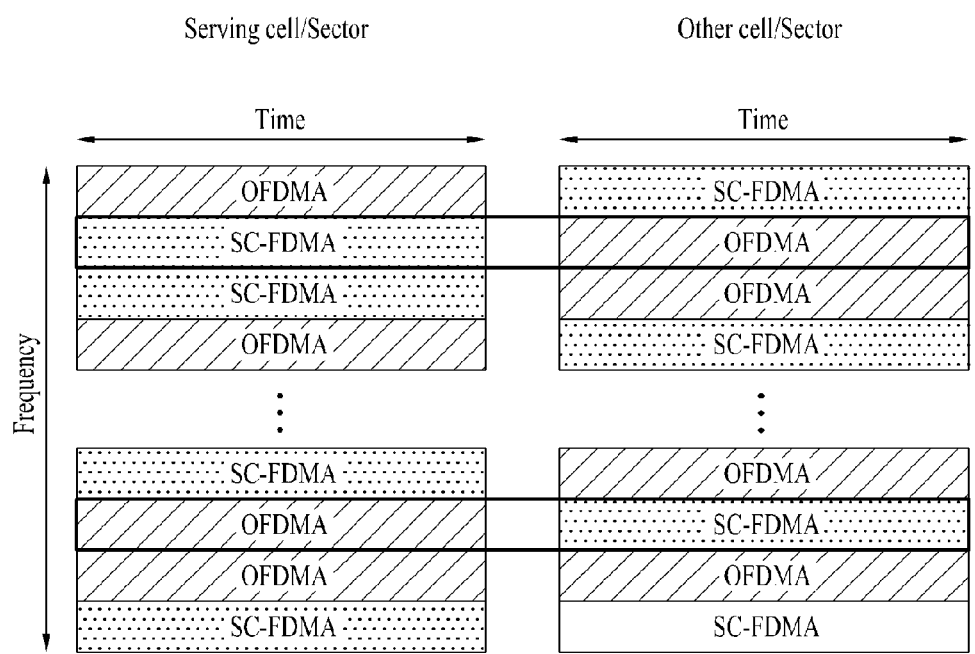
FIG. 5 is a diagram illustrating a case where a serving cell and other cell use a hybrid multiple access scheme under a multi-cell environment.

FIG. 5 is a diagram illustrating a case where a serving cell and other cell use a hybrid multiple access scheme under a multi-cell environment.

In FIG. 5, the serving cell and other cell are only considered under the multi-cell environment. A vertical axis illustrates a frequency band, and a horizontal axis illustrates a time region. For example, a case where the serving cell is SC-FDMA region and other cell is OFDMA region in the same frequency band of FIG. 5 will be described.

Referring to FIG. 4(*a*), the base station uniformly allocates pilot signals (reference signals) on the time axis to maintain a single carrier effect in the SC-FDMA region of the serving cell. Accordingly, in the same frequency band of FIG. 5, pilot signals of the serving cell may interfere with data subcarriers allocated to the OFDMA region of the other cell.

Furthermore, a case where the serving cell uses the OFDMA region and the other cell uses the SC-FDMA region in FIG. 5 will be described.

The OFDMA system applies a power higher than that of other data signals to pilot signals (or reference signals) for efficient channel estimation. Referring to FIG. 4(*b*), the OFDMA system allocates the pilot signals or the reference signals in a distributed mode on the time and frequency axes to obtain flexibility of channel allocation in the OFDMA region of the serving cell. Accordingly, the OFDMA system may cause inner interference due to power unbalance with data subcarriers allocated to the SC-FDMA region of other cell in the same frequency band of FIG. 5. For this reason, system throughput may be degraded.

Figure 6:
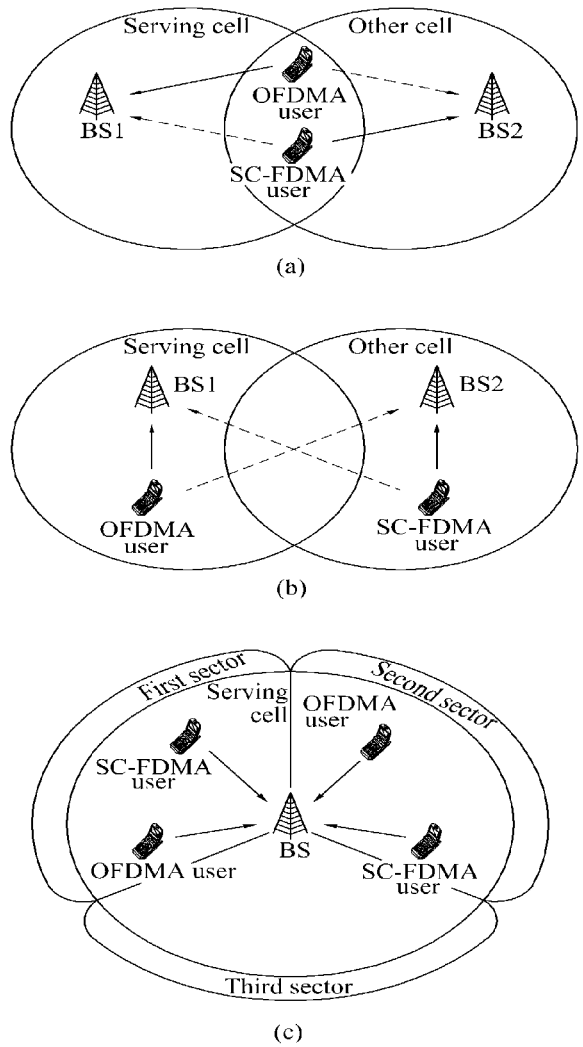
FIG. 6 is a diagram illustrating interference effect during data transmission between a base station and a mobile station, which use a hybrid multiple access scheme under a multi-cell environment.

FIG. 6 is a diagram illustrating interference effect during data transmission between a base station and a mobile station, which use a hybrid multiple access scheme under a multi-cell environment.

FIG. 6(*a*) illustrates a case where two cells are overlapped with each other under a multi-cell environment. Also, FIG. 6(*a*) illustrates a case where one or more mobile stations (OFDMA users or SC-FDMA users) exist in the boundary between the serving cell and other cell. At this time, one or more mobile stations can be operated in accordance with different multiple access modes in the same frequency band.

Referring to FIG. 6(*a*), the mobile station (OFDMA user) which uses the OFDMA scheme as the multiple access scheme performs communication through the OFDMA region allocated from a serving base station (BS 1). However, since transmission signals transmitted from the mobile station are propagated to the air non-directionally, the transmission signals can be transmitted to other base station (BS 2) of other cell. At this time, the transmission signals transmitted to other base station may act as interference in other base station.

Furthermore, the mobile station (SC-FDMA user) which uses the SC-FDMA scheme performs communication through the SC-FDMA region allocated to the serving base station (BS 2). At this time, transmission signals transmitted from the mobile station which uses the SC-FDMA scheme are propagated to the air non-directionally. Accordingly, the serving base station can receive uplink transmission signals from the mobile station which uses the SC-FDMA scheme. These transmission signals may act as interference in the serving base station.

Referring to FIG. 6(*b*), even though the mobile stations which uses different multiple access schemes are not located in the boundary between the serving cell and other cell, interference may occur. For example, the transmission signals of the mobile station (OFDMA user) which uses the OFDMA scheme in the same frequency region may be transmitted to the BS 2, and the transmission signals of the mobile station which uses the SC-FDMA scheme may be transmitted to the BS 1. At this time, since the pilot signals or the reference signals among the transmission signals have a transmission pattern different from that of data signals or a power higher than that of the data signals, they may act as interference in their respective cell regions.

FIG. 6(*c*) illustrates a case where one or more mobile stations included in the same cell region use different multiple access schemes. Since different transmission modes can be applied to each sector even in case of one cell region, if the respective mobile stations uses different multiple access schemes in the same radio resource region, inner interference may occur.

Figure 7:
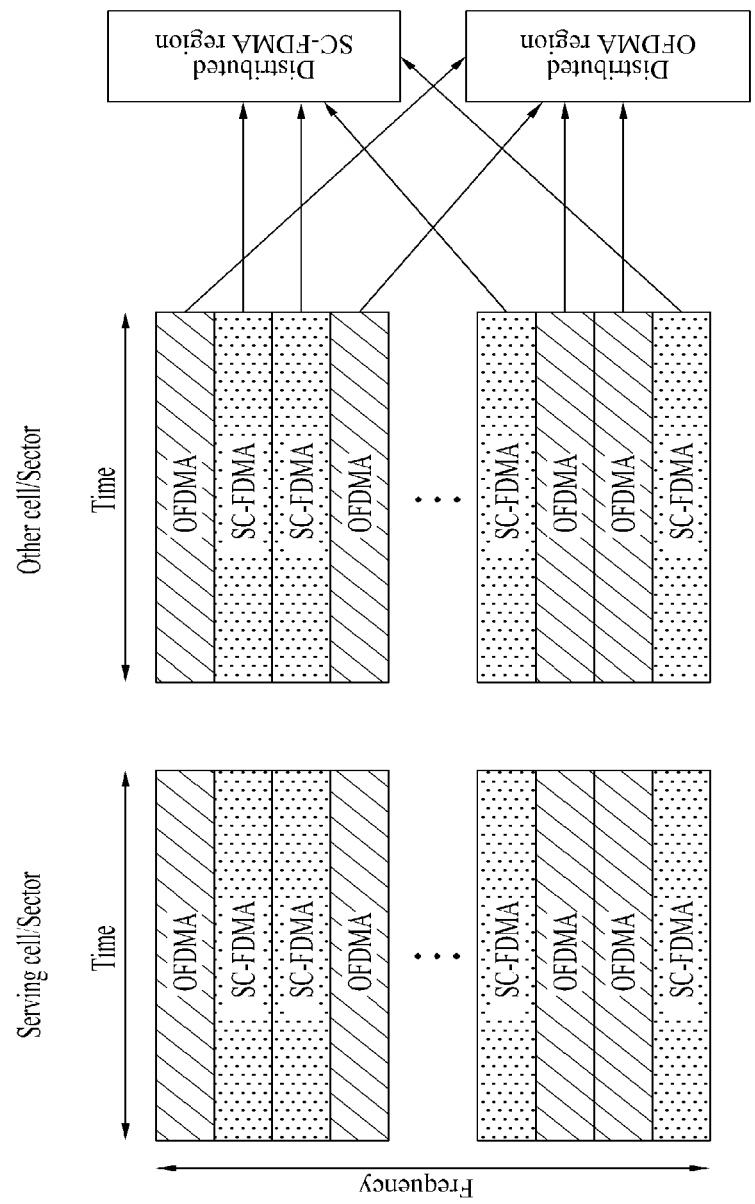
FIG. 7 is a diagram illustrating a multiple access structure where a multiple access region is multiplexed in a distributed mode when one or more multiple access schemes are used together in accordance with one embodiment of the present invention.

FIG. 7 is a diagram illustrating a multiple access structure where a multiple access region is multiplexed in a distributed mode when one or more multiple access schemes are used together in accordance with one embodiment of the present invention.

In FIG. 7, the hybrid multiple access scheme which uses one or more multiple access schemes together is used. For example, it is assumed that the OFDMA scheme and the SC-FDMA scheme are used together. Of course, other multiple access scheme may be used in accordance with requirements of a user or communication environment.

Referring to FIG. 7, the base station can allocate the OFDMA region and the SC-FDMA region in accordance with a distributed mode in a frequency band based on the frequency region. At this time, the base station can multiplex the radio resource region by selecting advantages of the OFDMA scheme and the SC-FDMA scheme. For example, the base station can multiplex a multiple access region so that each multiple access scheme maintains a frequency division multiplexing (FDM) mode, considering inner interference of the pilot signals (or reference signals).

In other words, as illustrated in FIG. 7, the base station can multiplex the multiple access region used in a cell or sector of the serving base station or a cell or sector of other base station so that the same multiple access scheme is used in the same frequency band. In FIG. 7, the multiple access regions are equally allocated to the serving base station and other base station in accordance with the FDM mode. Accordingly, the serving cell can solve interference caused by other cell in the same frequency band.

If the multiple access regions are multiplexed as illustrated in FIG. 7, the base station is affected on the same time axis by inter-pilot interference or inter-RS-interference from the mobile stations which use their respective SC-FDMA schemes. Accordingly, a code division multiplexing (CDM) method (for example, a case where it is designed to have orthogonality between sequences used in pilot signals, a case where cyclic shift is used to maintain orthogonality using CAZAC sequences, and a case where different root indexes having near-orthogonality are used) can be applied to the existing SC-FDMA system.

In other words, if the method of FIG. 7 is used, a single carrier effect which is an advantage of the SC-FDMA system can be maintained, and cell coverage can increase by allocating a control channel to the SC-FDMA multiple access regions.

Furthermore, if the base station multiplexes transmission regions of the mobile stations, which use their respective OFDMA scheme, in accordance with technical spirits of the present invention, interference of OFDMA pilot signals (or reference signals) distributed based on the time and frequency axes can be reduced. For example, the base station can reduce inter-pilot signal interference in a CDM mode by giving cell-specific sequence to the pilot signals (or reference signals). In other words, if the multiple access structure illustrated in FIG. 7 is used, it is possible to obtain both the single carrier effect of the SC-FDMA scheme and flexibility of the OFDMA scheme.

Figure 8:
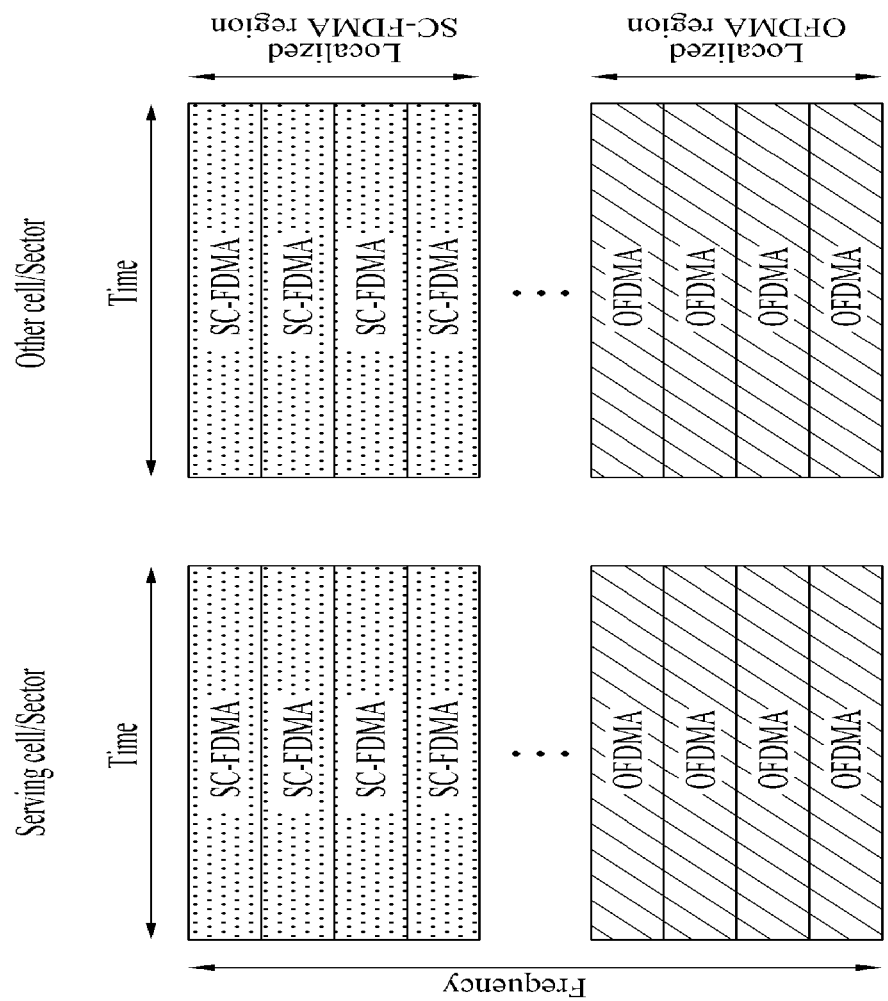
FIG. 8 is a diagram illustrating a multiple access structure where a multiple access region is multiplexed in a localized mode when one or more multiple access schemes are used together in accordance with another embodiment of the present invention.

FIG. 8 is a diagram illustrating a multiple access structure where a multiple access region is multiplexed in a localized mode when one or more multiple access schemes are used together in accordance with another embodiment of the present invention.

Technical spirits of FIG. 8 are similar to those of FIG. 7. Namely, FIG. 8 is directed to a method for multiplexing a multiple access region to maintain the FDM mode. However, unlike FIG. 7, FIG. 8 illustrates that a multiple access region is configured in a localized mode.

Figure 9:
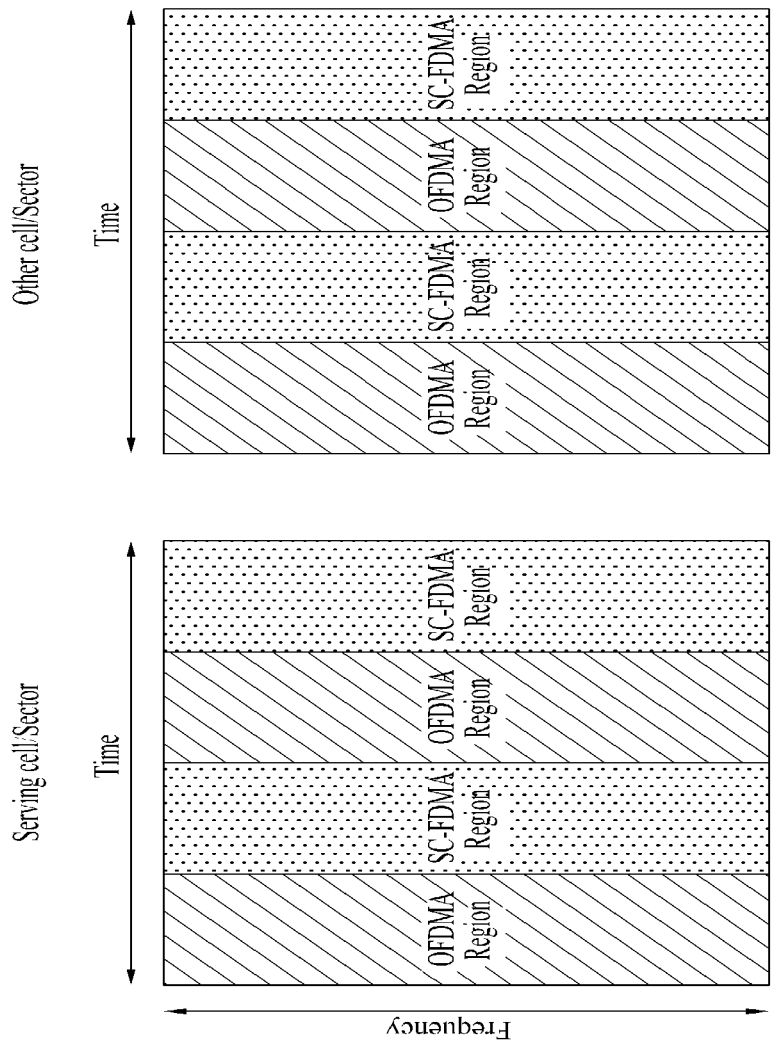
FIG. 9 is a diagram illustrating a multiple access structure where a multiple access region is multiplexed in a TDM mode when one or more multiple access schemes are used together in accordance with other embodiment of the present invention.

FIG. 9 is a diagram illustrating a multiple access structure where a multiple access region is multiplexed in accordance with a TDM mode when one or more multiple access schemes are used together in accordance with other embodiment of the present invention.

Referring to FIG. 9, the base station can allocate radio resources to the mobile station in a distributed mode of the OFDMA region and the SC-FDMA region based on the time region. At this time, the base station can multiplex the radio resources by selecting the advantages of the OFDMA scheme and the SC-FDMA scheme. For example, the base station can multiplex a multiple access region so that each multiple access scheme maintains a time division multiplexing (TDM) mode, considering inner interference of the pilot signals (or reference signals).

Furthermore, the TDM method of the multiple access region is advantageous in that the single carrier effect can be maintained with respect to the SC-FDMA multiple access region and that cell coverage can increase when a control channel is allocated to the SC-FDMA region in accordance with FIG. 9. As compared with FIG. 7 and FIG. 8, the TDM method of FIG. 9 is additionally advantageous in that flexibility is high in view of resource allocation to the frequency bands of the SC-FDMA multiple access region and the OFDMA multiple access region.

If the methods described with reference to FIG. 7 to FIG. 9 are used during cell design, the divided multiple access regions can be fixed statically, or can be allocated semi-statically or dynamically. At this time, information exchange of multiple access regions multiplexed between cells is required. Accordingly, this information can be shared between cells or sectors through a backbone network or proper wireless interface.

Furthermore, in case of a synchronous system, the base station can notify the mobile station of information or rate of a multiple access region of a specific time and specific region using the method for multiplexing the multiple access region of the FDM or TDM mode described in FIG. 7 to FIG. 9.

For example, the base station can allocates x % to the OFDMA region and (100−x) % to the SC-FDMA region for a certain time period. The base station can notify the mobile station of information of an allocation rate for the OFDMA region and the SC-FDMA region.

Furthermore, the base station can notify the mobile station of frequency resources for each multiple access regions for a certain time period as follows. The base station can logically allocate OFDMA to the first subcarrier to the tenth subcarrier, SC-FDMA to the eleventh subcarrier to the twentieth subcarrier, OFDMA to the xth subcarrier to the yth subcarrier, and SC-FDMA to the ath subcarrier to the bth subcarrier. Namely, the base station can notify predetermined time information and frequency information of a plurality of mobile stations through signaling so that the plurality of mobile stations can equally multiplex multiple access regions for a predetermined time.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The embodiments of the present invention can be applied to various wireless access systems. Examples of various wireless access systems include 3GPP (3rd Generation Partnership Project) system, 3GPP2 system and/or IEEE 802.xx (Institute of Electrical and Electronic Engineers 802) system. The embodiments of the present invention can be applied to all technical fields to which the various access systems are applied, as well as the various access systems.

The invention claimed is:
1. A method of multiplexing one or more multiple access regions in a wireless access system, the method comprising:
  multiplexing the one or more multiple access regions so that a first base station and a second base station use a same multiple access scheme in a predetermined resource region allocated to each of the first base station and the second base station, wherein the first base station and the second base station are among a plurality of a base stations which collectively and concurrently use a plurality of different multiple access schemes under a multi-cell environment; and
  transmitting multiplexing information acquired when multiplexing the one or more multiple access regions to a mobile station included in a cell region of the plurality of base stations,
  wherein the one or more multiple access schemes include a single carrier frequency division multiple access (SC-FDMA) scheme and an orthogonal frequency division multiple access (OFDMA) scheme, and
  wherein the multiplexing the one or more multiple access regions includes distributing the one or more multiple access regions in accordance with the SC-FDMA scheme and the OFDMA scheme, and
  wherein the predetermined resource region is one of a plurality of resource regions divided according to frequency band.
2. The method of claim 1, wherein the multiplexing information includes information as to whether any one of the SC-FDMA scheme and the OFDMA scheme is used in the predetermined resource region.
3. The method of claim 1, further comprising sharing the multiplexing information among the plurality of base stations through a backbone network.
4. A method of multiplexing multiple access regions in a wireless access system, the method comprising:
  multiplexing the multiple access regions so that a first base station and a second base station use a single multiple access scheme in a predetermined resource region allocated to each of the first base station and the second base station, wherein the first base station and the second base station are among a plurality of base stations which collectively and concurrently use a plurality of different multiple access schemes under a multi-cell environment;

transmitting multiplexing information acquired from performing the multiplexing the multiple access regions to a mobile station included in a cell region of the plurality of base stations, wherein the multiple access schemes include a single carrier frequency division multiple access (SC-FDMA) scheme and an orthogonal frequency division multiple access (OFDMA) scheme, and wherein the predetermined resource region is one of a plurality of resource regions divided according to frequency band.

5. The method of claim 4, wherein the multiplexing the multiple access regions includes distributing the multiple access regions in accordance with the SC-FDMA scheme and the OFDMA scheme.

* * * * *